(12) United States Patent
Chabanne et al.

(10) Patent No.: US 9,075,973 B2
(45) Date of Patent: Jul. 7, 2015

(54) IDENTIFICATION BY MEANS OF CHECKING A USER'S BIOMETRIC DATA

(75) Inventors: Herve Chabanne, Paris (FR); Julien Bringer, Paris (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 13/504,451

(22) PCT Filed: Oct. 27, 2010

(86) PCT No.: PCT/FR2010/052308
§ 371 (c)(1),
(2), (4) Date: Apr. 26, 2012

(87) PCT Pub. No.: WO2011/051624
PCT Pub. Date: May 5, 2011

(65) Prior Publication Data
US 2012/0239940 A1    Sep. 20, 2012

(30) Foreign Application Priority Data

Oct. 28, 2009 (FR) ...................................... 09 57595

(51) Int. Cl.
*G06F 21/00* (2013.01)
*G06F 21/32* (2013.01)
*G06F 21/62* (2013.01)
*G06K 9/62* (2006.01)

(52) U.S. Cl.
CPC .............. *G06F 21/32* (2013.01); *G06F 21/00* (2013.01); *G06F 21/6245* (2013.01); *G06K 9/6276* (2013.01)

(58) Field of Classification Search
CPC ..... G06F 21/32; H04L 9/3231; H04L 9/3236; H04L 9/3242
USPC .......... 382/115, 124, 125; 713/176, 178, 182, 713/186; 726/9
See application file for complete search history.

(56) References Cited

U.S. PATENT DOCUMENTS

| | | | |
|---|---|---|---|
| 5,790,668 A * | 8/1998 | Tomko | 713/186 |
| 6,292,795 B1 * | 9/2001 | Peters et al. | 1/1 |
| 2003/0061233 A1 * | 3/2003 | Manasse et al. | 707/104.1 |
| 2007/0008789 A1 | 1/2007 | Kwak | |
| 2007/0038863 A1 * | 2/2007 | Nguyen et al. | 713/176 |

(Continued)

FOREIGN PATENT DOCUMENTS

WO    WO-2007/008789 A2    1/2007

OTHER PUBLICATIONS

Tulyakov et al., Symmetric hash functions for secure fingerprint biometric systems, Aug. 2007.*

(Continued)

*Primary Examiner* — Andrew Nalven
*Assistant Examiner* — Huan V Doan
(74) *Attorney, Agent, or Firm* — Marshall, Gerstein & Borun LLP

(57) ABSTRACT

The invention relates to a database (10) suitable for combining biometric data (b) and an identifier (Id(b)). For this purpose, biometric data (bref) are collected (101). Next, a plurality of keywords is generated (102) by means of applying a family (H) of hash functions to the biometric data. Then, a plurality of addresses (@i) is obtained (103) by means of applying an addressing function (F) to the plurality of keywords and to a secret key. Finally, the identifier is stored (104) at said plurality of addresses.

9 Claims, 2 Drawing Sheets

(56) References Cited

U.S. PATENT DOCUMENTS

2007/0130465 A1* 6/2007 Zeng et al. .................. 713/171
2007/0245154 A1* 10/2007 Akkermans et al. .......... 713/186
2008/0097983 A1 4/2008 Monro
2008/0209226 A1* 8/2008 Venkatesan et al. .......... 713/186
2010/0281269 A1* 11/2010 Kindarji et al. ............... 713/182

OTHER PUBLICATIONS

Bringer et al., "Extending Match-On-Card to Local Biometric Identification," *Biometric ID Mgmt. Multimodal Comm.* 5707:178-186 (2009).

Curtmola et al., "Searchable Symmetric Encryption: Improved Definitions and Efficient Constructions," *ACM Conference on Computer and Communications Security—CCS*, 1-33 (2006).

El Gamal, "A Public Key Cryptosystem and a Signature Scheme Based on Discrete Logarithms," *IEEE Transactions on Information Theory*, IT-31(4):469-72 (1985).

Indyk et al., "Approximate Nearest Neighbors: Towards Removing the Curse of Dimensionality," *STOC*, 604-13 (1998).

Kushilevitz et al., "Efficient Search for Approximate Nearest Neighbor in High Dimensional Spaces (1998)," retrieved from CiteSeerX on Oct. 2, 2013, http://citeseerx.ist.psu.edu/viewdoc/summary?doi=10.1.1.44.1300.

Kushilevitz et al., "Efficient Search for Approximate Nearest Neighbor in High Dimensional Spaces," *Siam J. Comput.* 30(2):457-74 (1998).

International Search Report of the International Searching Authority, European Patent Office, PCT/FR2010/052308, dated Jan. 19, 2011.

International Preliminary Report on Patentability and Written Opinion, PCT/FR2010/052308, dated Jun. 5, 2012.

* cited by examiner

IDENTIFICATION BY MEANS OF CHECKING A USER'S BIOMETRIC DATA

The invention relates to identity verification based on biometric data stored in a database, particularly when these data are stored in encrypted form.

Identification systems based on biometric data generally contain an identification unit which has access to a database containing biometric data which the identification unit uses to identify a particular person.

The biometric data stored in this database originate from an enrollment phase, during which a human part, such as fingerprints or the iris, is captured as digital biometric data and stored in the database for use as reference data to identify a particular person.

When the identification unit receives new biometric data, it is then able to determine the identity of the person with whom the new biometric data are associated, on the basis of a comparison between the received biometric data and the reference biometric data stored in the database.

It is generally important that such biometric data remain confidential, in order to protect the privacy of the people with whom these data are associated.

These biometric data may therefore be stored in encrypted form in the database.

In this case, the comparison step, consisting of comparing biometric data received from an identification unit with biometric data stored in the database, may then prove to be much more complex than in the case where these biometric data are stored in the database without encryption.

To perform such a database search, one might think it necessary to decrypt the biometric data stored in it. Such a decryption step is likely to seriously impact the efficiency of such a search in the database, as well as limit the end security.

There are known search systems which perform searches in a database comprising encrypted data.

The document "Searchable symmetric encryption: improved definitions and efficient constructions" from Reza Curtmola, Juan A. Garay, Seny Kamara, Rafail Ostrovsky (ACM Conference on Computer and Communications Security 2006) proposes managing the storage of documents in a database in a manner that enables searching this database in a protected manner.

A search can be performed based on the words contained in a dictionary, without having to reveal explicit information on the stored documents.

More specifically, the document proposes storing a document identifier at an address in the database, after obtaining this address by applying a family of hash functions to the document. In this manner, one is able to create indirect links between the document and storage address in the database in order to store these documents in encrypted form.

When a client wants to search the database for documents which contain a list of keywords, it calculates the addresses where the identifiers for these addresses are stored. Then it receives from the database a list of identifiers for the documents concerned.

This system is limited to document management, however.

US 2008/097983 A1 (Monro Donald Martin) relates to a method for improving the speed at which a database storing a large number of biometric records can recognize a biometric record submitted to it as being one of the biometric records stored in the database, within a given tolerance for error.

WO 2007/008789 A2 (Solidus Networks Inc, doing business as Pay By Touch, Nguyen Nhan, Hollowood Harry) relates to a method for storing user biometric information in a database. The method receives a PIN number and biometric information from a user. The method applies a calculation to the PIN number to generate a secret key. This secret key is used to encrypt the biometric information and then store it in the database.

The invention aims to improve this situation.

A first aspect of the invention proposes a method for managing a database associating a piece of biometric data and an identifier, said method comprising the following steps for each identifier to be associated with a piece of biometric data:

/1/ receiving a piece of biometric data;
/2/ generating a plurality of keywords by applying a family of hash functions to the piece of biometric data;
/3/ obtaining a plurality of addresses by applying an addressing function to the plurality of keywords and to a secret key;
/4/ storing said identifier at said plurality of addresses.

The term "piece of biometric data" is understood to mean biometric data which can be captured for a user U in an initial phase, referred to as the enrollment phase. No limitation is placed on the type of the biometric data.

The term "addressing function" is understood to mean a function adapted to receive a keyword and a secret key as input and to output an address in the database.

Such an addressing function may correspond to a lookup table which provides an address in the database based on a keyword and a secret key.

The term "secret key" is understood to mean any secret key generated in any manner. It may be dedicated to a user or to a set of users. No limitation is placed on this secret key nor on the context in which it is used.

The user is identified by an identifier Id. The aim is to associate, in the database, this identifier Id with the captured biometric data for this same user in order to be able to identify him or her at a later time.

For this purpose, this identifier Id is stored at different locations in the database, more specifically at different database addresses which are derived from the reference piece of biometric data, in combination with a secret key K. The association between the identifier and the piece of biometric data is therefore based on the fact that the addresses where the identifier is stored in the database are derived to some extent from the biometric data.

The biometric data is derived by applying a family H of hash functions, comprising the hash functions $h_1, \ldots, h_i, h_\mu$, where $\mu$ is any whole number. After this derivation, there are as many keywords as there are hash functions applied, each of these keywords representing to some extent the piece of biometric data. Then, on the basis of each keyword obtained in this manner and the secret key K, an address in the database is obtained by applying an addressing function F.

The identifier concerned Id, for the user to whom the biometric data corresponds, is stored at each of these addresses.

Under these conditions, the database concerned stores at different locations, or different places, an identifier corresponding to the same piece of biometric data. These different locations each represent this same piece of biometric data combined with a secret key.

By proceeding in this manner, it is possible to manage the storage of the association of biometric data and identifiers in encrypted form for making an identification, in a simple manner. The calculations used are relatively basic and simple to implement.

By applying a family of hash functions, one is able to store the same identifier at different locations in the database, and thus create a link between a plurality of database addresses and a piece of biometric data.

It should be noted that, for the same part of the same person, biometric data captured at time t may be different from biometric data captured at time t+1. Given this context, it is advantageous to store the same identifier for a piece of biometric data in this manner, to enable finding it later using this same family of hash functions.

Management by applying a family of hash functions allows spreading the spectrum of searches around the same piece of biometric data by defining keywords which allow identifying a piece of biometric data in a later identification step, even if it is different from the piece of biometric data which was used to fill the database.

The biometric data useful for user identification are not accessible in the database where they are stored. To access them, one must have possession of the secret key used to store them in an enrollment phase. In particular, this secret key may be a key allocated exclusively for a given user and kept secret by that user.

It should be noted that, without this key, it is not possible to establish a link between the identifiers stored in the database and the biometric data with which they are associated.

Advantageously, in such a database, it is possible and easy to search for an identifier on the basis of biometric data captured for a user, in order to identify this user while protecting the confidentiality of the biometric data.

In fact, in an identification phase, when the database is to be searched as a function of captured biometric data to be identified, it is sufficient to obtain a list of storage addresses based on the new biometric data to be identified, in a manner similar to what is done when storing the identifier in the steps described above for the enrollment phase. Then, in response to this request, the identifiers stored in the database are transmitted. Based on these identifiers, a user identification can be performed.

The family of hash functions can be LSH functions (Locality Sensitive Hashing), for example as described in the document of P. Indyk and R. Motwani, "Approximate Nearest Neighbors: Towards Removing the Curse of Dimensionality", STOC 1998.

In this case, the following relations are satisfied:

$$Pr_1[h(x)=h(x')|d(x,x')<r_1]>p_1$$

$$Pr_2[h(x)=h(x')|d(x,x')<r_2]>p_2$$

where p1 and p2 are probability values between 0 and 1, and p1>p2;

x and x' are biometric data;

d(x,x') represents the Hamming distance between the biometric data x and x';

$Pr_1$ indicates the probability that two values, derived from two different pieces of biometric data by applying a function h, are equal, with the distance separating them being less than $r_1$; and $Pr_2$ indicates the probability that two values, derived from two different pieces of biometric data by applying the function h, are equal, with the distance separating them being greater than $r_2$.

In order to increase the protection against certain attacks, in one embodiment of the invention the identifier is stored in encrypted form by applying a probabilistic encryption function on the basis of an encryption key and a random value.

In this manner, one can also guarantee that the identifiers are not accessible by statistical attacks. Here the same encrypted identifier value is never stored twice in the database. It is therefore impossible to establish any links between the different storage addresses and the identifiers, as it is impossible to determine the different storage locations for the same identifier in the database.

More specifically, a new random value is generated each time the same identifier is stored, so that the identifier is stored under different encryption values at each of its storage addresses in the database.

In one embodiment of the invention, in step /2/, a keyword is obtained by concatenating the result of applying a hash function to the piece of biometric data with an index associated with the applied hash function, indexes which differ from one another being respectively associated with the hash functions of the hash family.

Under these conditions, one can guarantee that during an identification, when the list of identifiers stored at a given address is requested, this list will not contain the same identifier more than once. It is thus more difficult for an attacker to establish links between the storage addresses and the identifiers.

This avoids sequentially storing identifiers in the database, which increases the protection against attacks.

A second aspect of the invention proposes a method of biometric identification using a database managed by a management method according to the first aspect of the invention, based on a family of hash functions, a secret key, and an addressing function;

said method comprising the following steps:
- /1/ receiving a piece of biometric data to be identified;
- /2/ generating a plurality of keywords by applying said family of hash functions to the piece of biometric data to be identified;
- /3/ generating a plurality of addresses by applying the addressing function to the plurality of keywords and to said secret key;
- /4/ issuing a request for identification indicating said list of addresses;
- /5/ receiving a list of identifiers for each of said addresses; and
- /6/ deciding whether an identifier in the list of identifiers is associated with the piece of biometric data to be identified, on the basis of a statistical analysis of the identifiers received.

With these characteristics, one can easily and simply make use of a database structured according to the first aspect of the invention.

Thus, biometric data is captured from a user to be identified. Then, using this biometric data to be identified, a set of addresses in the database can be determined by using the same family of hash functions, the same addressing function, and the same secret key used when filling the database.

More specifically, in one embodiment of the invention, new biometric data $b_{search}$ for a user to be identified is captured. Then, a plurality of keywords is obtained by applying the same family of hash functions H to the biometric data. Next, using the same function F and applying it to the secret key with each of the keywords, a plurality of addresses in the database is obtained.

By requesting the identifiers stored in the database at the addresses obtained in this manner, it is possible to determine by statistical analysis whether the user can be identified from the captured biometric data $b_{search}$.

It should be noted that if the biometric data stored in the database, or the reference biometric data $b_{ref}$ and the biometric data to be identified $b_{search}$ come from the same user, then they are close in the sense of the Hamming distance. If these biometric data come from the same person, then there is a high probability that the following inequality is satisfied:

$$d(b_{ref}, b_{search}) < \lambda_{min}$$

where d is the Hamming distance
and
$\lambda_{min}$ is a threshold value for the distance between two pieces of biometric data, below which these biometric data probably originate from the same person.

If these biometric data do not originate from the same person, then there is a strong probability the following inequality is satisfied:

$$d(b_{ref}, b_{search}) > \lambda_{max}$$

where d is the Hamming distance
and
$\lambda_{max}$ is a threshold value for the distance between two pieces of biometric data, above which these biometric data probably do not originate from the same person.

However, if two pieces of biometric data $b_{ref}$ and $b_{search}$ are neighbors, by the properties listed above concerning the family of hash functions, it is highly likely that the results from applying hash functions to these two pieces of biometric data are equal. There is consequently a high probability that the list of addresses obtained based on the biometric data to be identified corresponds to several addresses at which the user's identifier is stored.

Thus, by statistical analysis of the identifiers received back from the query, it is possible to identify the user or to decide that this user is not stored in the database.

Advantageously, the relation between the biometric data and the associated identifiers is protected when applying such a method according to one embodiment of the invention. In addition, this type of identification is based on calculations that are simple to implement.

However, it is not inconceivable that an attacker could eavesdrop on exchanges with the database, during the execution of an identification method according to an embodiment of the invention.

More specifically, when wanting to identify a person on the basis of biometric data, a piece of biometric data $b_{search}$ is captured. Then the addresses associated with this piece of biometric data are obtained:

$$@'_i = F(K, h_i(b_{search}))$$

where $b_{search}$ is the piece of biometric data to be identified;
K is the secret key considered for this identification:
F is the hash function.

For each of these addresses $@'_i$ a list of identifiers may possibly be retrieved as follows. For address $@'_1$, the following list is retrieved:

$$L_1 = \{id_{1,1}; \ldots; id_{1,N1}\}$$

For address $@'_2$, the following list is retrieved:

$$L_2 = \{id_{2,1}; \ldots; id_{2,N2}\}$$

And so on until address $@'_\mu$, at which the following list is retrieved:

$$L_\mu = \{id_{\mu,1}; \ldots; id_{\mu,N\mu}\}$$

At the moment of this step of transmitting to the identification unit the lists of identifiers retrieved from the database at the addresses provided by the addressing function, an attacker could also obtain these identifiers by listening to the transmission. By successively eavesdropping, the attacker could possibly establish relationships between the different lists of identifiers. Then, by statistical attacks and trial and error, he could violate some of the confidentiality of this identification method.

Therefore in one embodiment of the invention, the identifiers Id stored in the database, and the identifiers in transit from the database, are manipulated in encrypted form. More specifically, these identifiers are encrypted by applying an encryption so that it is not possible to determine whether or not the results issuing from this encryption $c_1$ and $c_2$ correspond to the same identifier Id.

For this purpose, a probabilistic encryption function based on both an encryption key and a random value is applied. By generating a random value for each new storage address for the identifier, it is possible to store the same identifier more than once under different encrypted values.

Such an encryption function has the property of indistinguishability. An El Gamal encryption function can be used here, for example: Taher El Gamal, A Public Key Cryptosystem and a Signature Scheme Based on Discrete Logarithms. *CRYPTO* 1984 (10-18). Other symmetric encryption functions can also be used, such as AES (Advanced Encryption Standard) in CBC mode (Cipher Block Chaining) or AES in CTR mode (Counter).

In this embodiment, the identifier is stored in encrypted form by applying an encryption function on the basis of an encryption key and a random value. In this case, a list of encrypted identifiers is received in step /5/. The method then additionally comprises the following steps after step /5/:
/i/ decrypting the identifiers received;
/ii/ selecting an identifier which appears among the received identifiers a number of times greater than a threshold value.

The threshold value can advantageously be defined as a function of the probabilistic encryption function.

By these arrangements, it is also possible to protect the exchanges of information between the identification unit and the database. In addition, even within the database it is not possible to determine the identifiers stored there.

This provides an identification system which has low calculation costs while guaranteeing a high level of protection for the confidentiality of the information managed within it.

In addition, in one embodiment of the invention, a keyword can be obtained by concatenating the result of applying a hash function to the reference biometric data or the biometric data to be identified, with an index associated with the applied hash function, indexes that are different from one another being respectively associated with the hash functions of the hash family.

By proceeding in this manner, it is advantageously possible to guarantee that the same identifier is not stored multiple times at the same address in the database.

A third aspect of the invention proposes a database management unit adapted to implement a management method according to the first aspect of the invention.

A fourth aspect of the invention proposes an identification unit adapted to implement an identification method according to the second aspect of the invention.

A fifth aspect of the invention proposes an identification system comprising a database management unit according to the third aspect of the invention, a database, and an identification unit according to the fourth aspect of the invention.

Other features and advantages of the invention will be apparent from the following description of one of its embodiments.

The invention will also be better understood with the aid of the drawings, in which.

In the context of the invention, the term "biometric data" is understood to mean data from a human which enable identifying him or her. These biometric data are generally obtained by a sensor. Such a sensor can be adapted to capture the biometric data for a fingerprint, an iris, a face, handwriting, or a voice signature for example.

An identification system comprises a database, a database management unit, and an identification unit. No limitation is placed on this architecture. In particular, the management unit and the identification unit can of course correspond to a single unit.

Figure 1:
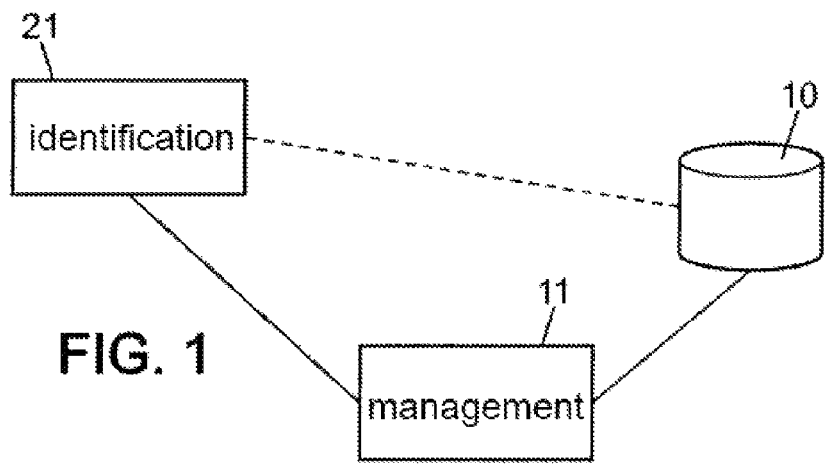
FIG. 1 illustrates an identification system according to one embodiment of the invention.

FIG. 1 illustrates an identification system according to one embodiment of the invention. Such an identification system therefore comprises a database 10, a management unit 11, and an identification unit 21. The identification unit 21 may comprise a biometric data sensor and be able to implement the steps for obtaining a list of addresses in the database according to one embodiment. In this case, it is easy to envisage having a direct interface between the database 10 and the identification unit. One can also envisage the identification unit 21 being simply in charge of capturing the biometric data $b_{search}$ to be identified. In this case, this biometric data is sent to the management unit 11 which is responsible for determining the addresses $@_i$ in the database for an identification phase according to one embodiment. It is easy to define different architectures implementing the principles of an embodiment of the invention. No limitation is placed on the architecture of such an identification system.

However, for illustrative purposes, in the following sections the management unit is in charge of determining the addresses $@_i$ on the basis of reference biometric data $b_{ref}$ during a phase of filling in the database (also referred to as the enrollment phase), and the identification unit 21 is in charge of determining the addresses $@_i$ on the basis of biometric data to be identified $b_{search}$ and retrieving the corresponding identifiers directly from the database 10.

In order to increase the level of protection for the confidentiality of the exchanges within this identification system, secure communication links can advantageously be used.

Figure 2:
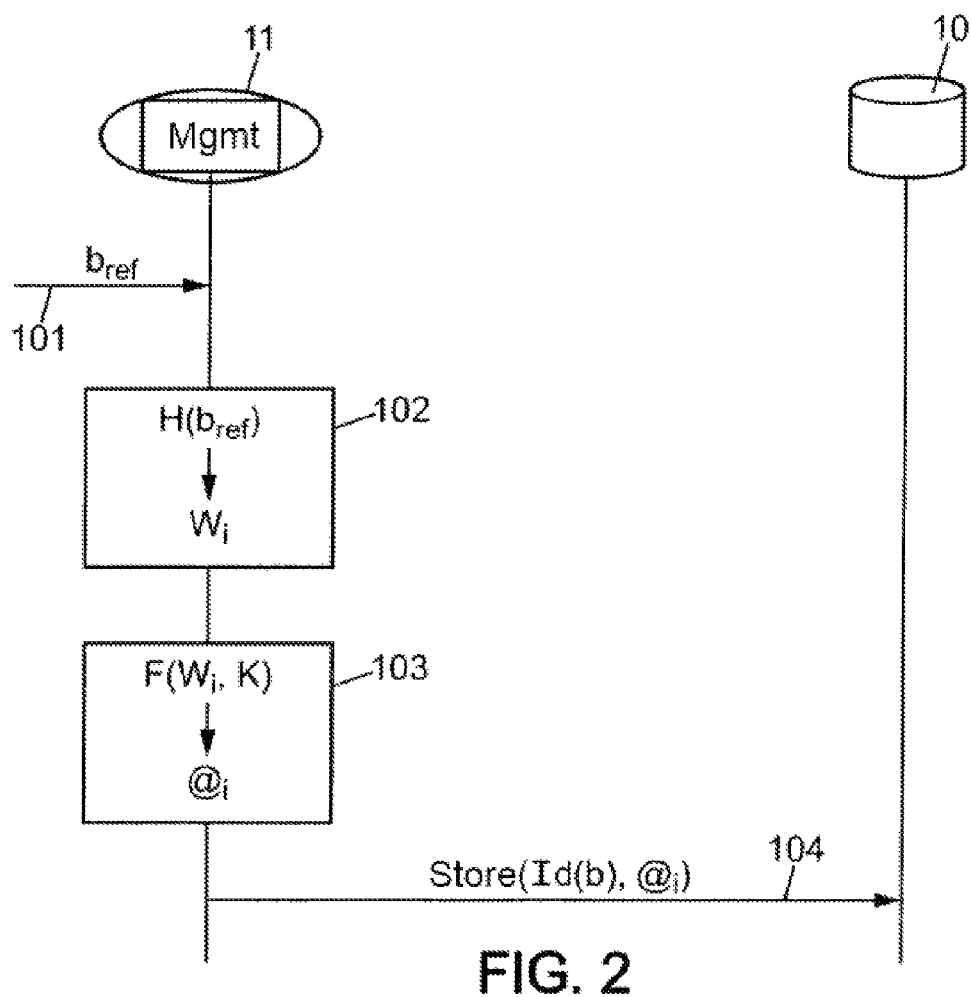
FIG. 2 illustrates the main principles of managing a database according to an embodiment of the invention.

FIG. 2 illustrates the main steps of a database management method according to an embodiment of the invention.

A management unit 11 is in charge of managing a database 10 associating biometric data with respective identifiers according to one embodiment of the invention. The management unit 11 receives a message 101 comprising biometric data b to be associated with an identifier Id for a user U in the database 10 for later identification searches.

This biometric data b is referred to below as "reference biometric data" $b_{ref}$.

In a step 102, a plurality of keywords is generated by applying a family H of hash functions to the biometric data. The family of functions H comprises the hash functions $h_i$ where i is between 1 and μ.

The LSH type of hash functions may be used for this purpose.

An LSH function is a hash function which has the property of providing a similar result when it is applied to neighboring points in a metric space. Such a function is defined in the document "Approximate Nearest Neighbors: Towards Removing the Curse of Dimensionality" by P. Indyk and R. Motwani, STOC 1998.

Let B be a metric space, let U be a set of incoming values from the hash functions of the family in question, and let r1 and r2 be two real numbers satisfying:

$r1 < r2$ with p1 and p2 belonging to the set [0, 1] and satisfying:

$p1 > p2$ and H being a family of hash functions $h_1, \ldots, h_\mu$.

Every function $h_i$, where i is between 1 and μ, from B to U, is a function (r1, r2, p1, p2)-LSH, if we have, for any function $h_i$ in the family H and for any element a and b of the set B:

if $d_B(a,b) < r1$, then $Pr[h_i(a) = h_i(b)] > p1$ and if $d_B(a,b) > r2$, then $Pr[h_i(a) = h_i(b)] < p2$ where $d_B(a,b)$ is the distance between a and b elements of B in the metric space B.

One can, for example, take a family H of LSH functions corresponding to the set of all canonical projections in the Hamming space $\{0, 1\}^n$.

In this case, each function $h_i$ establishes a correspondence between a value $x_i$ and a set of values $(x_1, \ldots, x_n)$.

Then for every r1 and r2 that are part of the set of integers between 1 and n, and satisfying:

$r1 < r2$, the functions $h_i$ are said to be the functions $(r_1, r_2, 1-r_1/n, 1-r_2/n)$-LSH.

It is also advantageous in the context of the invention to apply a family of LSH functions as proposed in the document "Efficient search for approximate nearest neighbor in high dimensional spaces."

At the end of this step 102, one therefore has a set of keyword values $w_i$ respectively obtained by applying functions $h_i$ to the piece of biometric data $b_{ref}$. These values $w_i$ are referred to as keywords because they are used to perform searches in the database 10.

Next, in a step 103, a plurality of addresses $@_i$ in the database is obtained by applying an addressing function F to the plurality of keywords and to a secret key K.

This addressing function F is adapted to establish a correspondence between a secret key K and a keyword $w_i$ to an address in the database. No limitation is placed on this function F.

Thus μ addresses $@_i$ are obtained in the database, i being between 1 and μ, one address for each keyword:

$@_i = F(K, h_i(b))$

Then the database management unit sends a message 104 to the database so that the identifier Id associated with the piece of biometric data $b_{ref}$ is stored μ times at the μ addresses $@_i$ obtained in this manner.

In this context, it is possible to obtain the same address $@_i$ for two different pieces of biometric data b and b". In fact, it is sufficient for the biometric data b" to satisfy:

$h_i(b") = h_i(b)$

In other words, this is the case where the pieces of biometric data b and b" are neighbors in the LSH sense.

As a result, it is possible for two different pieces of biometric data originating from two different users but neighbors in the LSH sense to be stored at the same address.

As a result, a list of identifiers may be stored at the same address $@_i$. In one embodiment, a constant number of identifiers is stored per address $@_i$, to avoid providing information which could facilitate a statistical attack on confidential information.

Thus a number $N_{max}$ of identifiers is stored per address $@_i$, some of these identifiers being virtual and not corresponding to any actual biometric data for a user.

In addition, in order to guarantee that a same identifier Id is not stored twice at the same address $@_i$, in one advantageous embodiment the result that is output from a hash function $h_i$ is concatenated with a value, or index, dedicated to it within the hash function family. For example, this value can be considered as corresponding to its rank i in the family of hash functions for obtaining a different keyword relative to each hash function $h_i$.

It can thus be arranged so that the keywords $w_i$ satisfy the following equation:

$$w_i = h_i(b_{ref})|i$$

The following sections describe an initialization step, an enrollment step, meaning the storage of an association between biometric data $b_i$ and identifiers $Id_i$, i being between 1 and N, and an identification step according to one embodiment.

In an initialization step, a family of LSH hash functions and a secret key K are defined.

In an enrollment step, a set $\Delta$ of keywords is determined such that:

$$\Delta = \{h_i(b_k)|i; i \in [1,\mu], k \in [1,N]\}$$

Then, for each keyword $w_{i,k}$ of the set $\Delta$, a set of user identifiers from 1 to N is constructed such that:

$$h_i(b_k)|i = w_{i,k}$$

Then for each $w_i$ of $\Delta$,
for j between 1 and $|D(w_i)|$:

$$@_{i,j} = F(w_i|j)$$

It should be noted here that the keyword $w_i$ is concatenated with the rank j of the identifier in the list of identifiers. In this context of an enrollment phase grouped for multiple users, per the above equation, it is guaranteed that the identifiers are not stored in a sequential order.

As stated above, that it is preferable if the same number of identifiers is stored at each of the addresses $@_{i,j}$.

In one variant, the identifiers $Id_i$ are encrypted with a probabilistic encryption function $\epsilon$ on the basis of a random value $r_i$ and an encryption key s. In this case, the identifiers are stored in the form:

$$\epsilon(Id_i, r_i, s), \text{ denoted } \epsilon(Id_i) \text{ below.}$$

Figure 3:
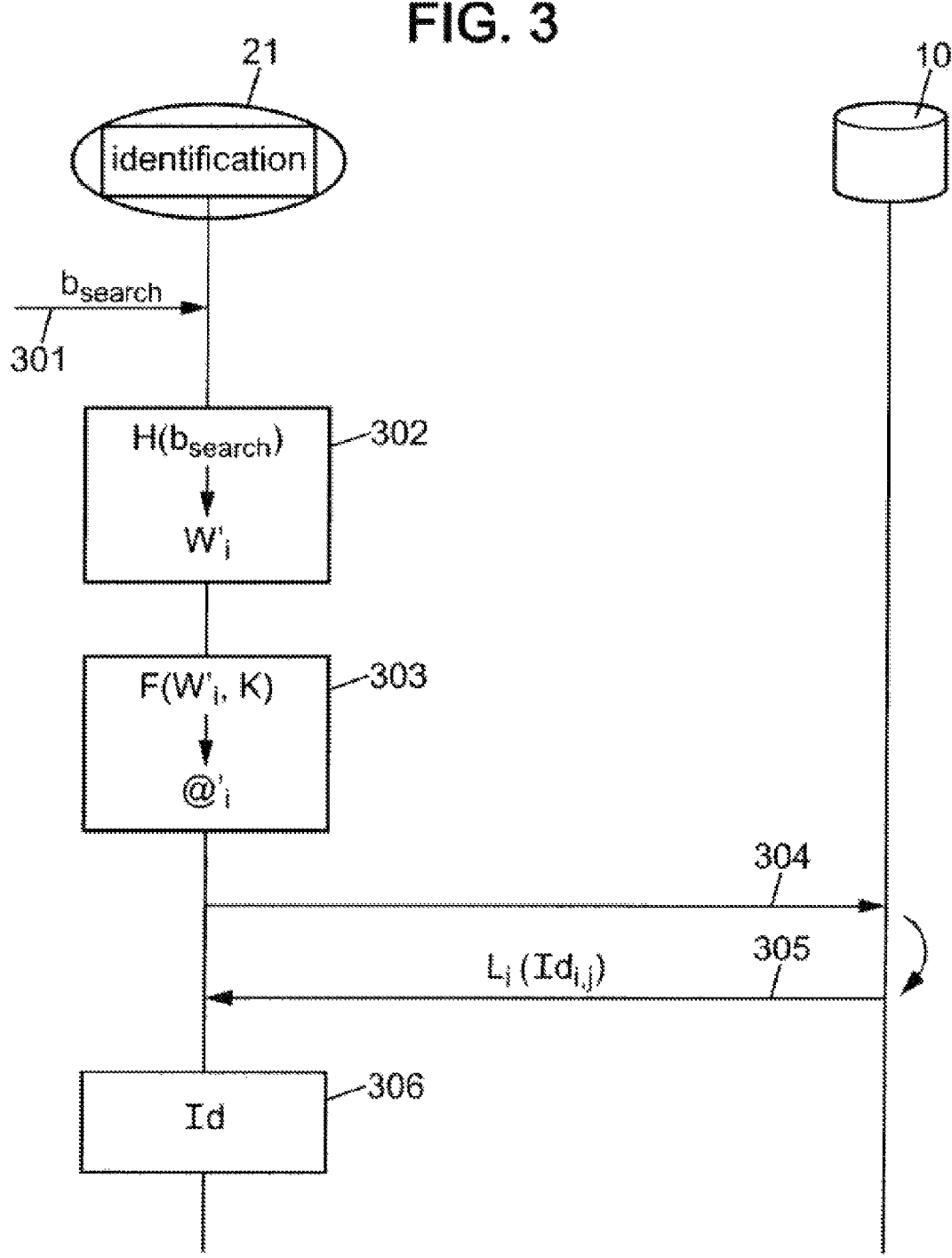
FIG. 3 illustrates the main steps of an identification according to one embodiment of the invention.

FIG. 3 illustrates an identification according to an embodiment of the invention.

In this context, to identify a user on the basis of biometric data, a piece of biometric data to be identified $b_{search}$ is received 301 for this user. In a step 302, keywords $w'_i$ are determined by respectively applying hash functions to the piece of biometric data to be identified.

$$w'_i = h_i(b_{search})$$

In a variant, in order to avoid storing the same identifier multiple times at the same address, the keywords satisfy:

$$w'_i = h_i(b_{search})|i$$

Then, in a step 303, the database addresses associated with this piece of biometric data are obtained:

$$@'_i = F(K, w'_i)$$

This list of addresses is sent to the database 10 via a message 304.

For each of these addresses, a list of identifiers is retrieved as follows, via a message 305. For the address $@'_1$, the following list is retrieved:

$$L_1 = \{id_{1,1}; \ldots; id_{1,Nmax}\}$$

For the address $@'_2$, the following list is retrieved:

$$L_2 = \{id_{2,1}; \ldots; id_{2,Nmax}\}$$

And so on until the address $@'_\mu$, where the following list is retrieved:

$$L_\mu = \{id_{\mu,1}; \ldots; id_{\mu,Nmax}\}$$

where $id_{j,k}$ represents the identifier stored at address $@'_j$ at rank k.

Then in step 306 one is able to identify or not identify the user concerned, on the basis of a statistical analysis.

In the case where the identifiers are encrypted, the retrieved lists are as follows. For the address $@'_1$, the following list is retrieved:

$$L_1 = \{\epsilon(id_{1,1}); \ldots; \epsilon(id_{1,Nmax})\}$$

For the address $@'_2$, the following list is retrieved:

$$L_2 = \{\epsilon(id_{2,1}); \ldots; \epsilon(id_{2,Nmax})\}$$

And so on until the address $@'_\mu$, where the following list is retrieved:

$$L_\mu = \{\epsilon(id_{\mu,1}); \ldots; \epsilon(id_{\mu,Nmax})\}$$

In this case, all the identifiers received are decrypted. The number of occurrences of each of the identifiers is determined in order to determine the list of the one appearing a number of times greater than a threshold value $\lambda_\mu$.

Under the conditions given above, the identification system in one embodiment not only offers the advantage of being easy to implement but also guarantees a high level of protection for the confidentiality of the information.

The invention claimed is:

1. Method for managing a database, said method comprising the following steps for an identifier to be associated with a piece of biometric data:
   /1/ a hardware database management unit receiving a said piece of biometric data;
   /2/ said hardware database management unit generating a plurality of keywords by applying a family of hash functions to said piece of biometric data;
   /3/ said hardware database management unit obtaining a plurality of addresses by applying an addressing function to said plurality of keywords and to a secret key;
   /4/ said hardware database management unit storing said identifier in said database at said plurality of addresses.

2. Method for managing a database according to claim 1, said hardware database management unit storing said identifier in the database in encrypted form by applying a probabilistic encryption function on the basis of an encryption key and a random value.

3. Method for managing a database according to claim 1, comprising, in step /2/, said hardware database management unit generating a keyword by concatenating the result of applying a hash function to said piece of biometric data with an index associated with the applied hash function,
   indexes which differ from one another being respectively associated with the hash functions of the hash family.

4. Method of biometric identification using a database managed according to a method according to claim 1, based on a family of hash functions, a secret key, and an addressing function;
   said method comprising the following steps:

/1/ a hardware identification unit receiving a piece of biometric data to be identified;

/2/ said hardware identification unit generating a plurality of keywords by applying said family of hash functions to said piece of biometric data to be identified;

/3/ said hardware identification unit generating a plurality of addresses by applying the addressing function to the plurality of keywords and to said secret key;

/4/ said hardware identification unit issuing to said data base a request for identification, said request indicating said plurality of addresses;

/5/ said hardware identification unit receiving from said database a list of identifiers wherein identifiers contained in said list of identifiers are stored in said database at the addresses contained in said plurality of addresses; and /6/ said hardware identification unit deciding whether a particular identifier in said list of identifiers is associated with said piece of biometric data to be identified, on the basis of a statistical analysis of the identifiers contained in said list of identifiers.

5. Method of biometric identification using a database managed according to claim 1, based on a family of hash functions, a secret key, and an addressing function; wherein said identifier is stored in said database by said hardware database management unit in encrypted form by said hardware database management unit applying a probabilistic encryption function on the basis of an encryption key and a random value, said method comprising the following steps:

/1/ a hardware identification unit receiving a piece of biometric data to be identified;

/2/ said hardware identification unit generating a plurality of keywords by applying said family of hash functions to said piece of biometric data to be identified;

/3/ said hardware identification unit generating a plurality of addresses by applying the addressing function to the plurality of keywords and to said secret key;

/4/ said hardware identification unit issuing to said data base a request for identification, said request indicating said plurality of addresses;

/5/ said hardware identification unit receiving from said database a list of encrypted identifiers from said database wherein encrypted identifiers contained in said list of encrypted identifiers are stored in said database at said plurality of addresses;

/6/ said hardware identification unit decrypting each encrypted identifier contained in said list of encrypted identifiers to a respective unencrypted identifier;

/7/ said hardware identification unit selecting a particular unencrypted identifier if it appears a number of times greater than a threshold value;

/8/ said hardware identification unit deciding whether a particular unencrypted identifier is associated with said piece of biometric data to be identified, on the basis of a statistical analysis.

6. Method of biometric identification according to claim 4, said hardware identification unit generating a keyword by concatenating the result of applying a hash function to the piece of biometric data with a value associated with the applied hash function, values which differ from one another being respectively associated with the hash functions of the hash family.

7. A hardware database management unit for a database associating a piece of biometric data and an identifier, wherein:

the hardware database management unit comprises a receiver arranged, for the identifier to be associated with the piece of biometric data, to receive the piece of biometric data;

the hardware database management unit comprises a calculator arranged, for the identifier to be associated with the piece of biometric data, to generate a plurality of keywords by applying a family of hash functions to the piece of biometric data;

the calculator of the hardware database management unit arranged, for the identifier to be associated with the piece of biometric data, to obtain a plurality of addresses by applying an addressing function to the plurality of keywords and to a secret key;

the hardware database management unit comprises a transmitter arranged, for the identifier to be associated with the piece of biometric data, to store said identifier at said plurality of addresses.

8. A hardware identification unit for a database managed by a hardware database management unit according to claim 7 based on the family of hash functions, the secret key, and the addressing function, wherein:

the hardware identification unit comprises a receiver arranged to receive the piece of biometric data to be identified;

the hardware identification unit comprises a calculator arranged to generate a plurality of keywords by applying said family of hash functions to the piece of biometric data to be identified;

the calculator of the hardware identification unit arranged to generate a plurality of addresses by applying said addressing function to the plurality of keywords and to said secret key;

the hardware identification unit comprises a transmitter arranged to issue to said database a request for identification indicating said plurality of addresses;

the receiver of the hardware identification unit arranged to receive from said database a list of identifiers wherein the identifiers contained in said list of identifiers were stored in said plurality of addresses in the database;

the calculator of the hardware identification unit arranged to decide whether a particular identifier in said list of identifiers is associated with the piece of biometric data to be identified, on the basis of a statistical analysis of the identifiers contained in said list of identifiers.

9. A hardware identification system comprising a hardware database management unit for a database, wherein:

the hardware database management unit comprises a receiver arranged, for an identifier to be associated with a piece of biometric data, to receive a piece of biometric data;

the hardware database management unit comprises a calculator arranged, for an identifier to be associated with the piece of biometric data, to generate a plurality of keywords by applying a family of hash functions to the piece of biometric data;

the calculator of the hardware database management unit arranged, for the identifier to be associated with the piece of biometric data, to obtain a plurality of addresses by applying an addressing function to the plurality of keywords and to a secret key;

the hardware database management unit comprises a transmitter arranged, for the identifier to be associated with the piece of biometric data, to store said identifier at said plurality of addresses;

the hardware identification system further comprising a hardware identification unit for said database managed by said hardware database management unit, wherein:

the hardware identification unit comprises a receiver arranged to receive a piece of unidentified biometric data to be identified;

the hardware identification unit comprises a calculator arranged to generate a plurality of keywords by applying said family of hash functions to the piece of unidentified biometric data to be identified;

the calculator of the hardware identification unit arranged to generate a plurality of addresses by applying said addressing function to the plurality of keywords and to said secret key;

the hardware identification unit comprises a transmitter arranged to issue to said database a request for identification indicating said plurality of addresses;

the receiver of the hardware identification unit arranged to receive from said database a list of identifiers wherein the identifiers contained in said list of identifiers are the identifiers stored in said database at the addresses contained in said plurality of addresses;

the calculator of the hardware identification unit arranged to decide whether a particular identifier in the list of identifiers is associated with the piece of unidentified biometric data to be identified, on the basis of a statistical analysis of the identifiers contained in said list of identifiers.

\* \* \* \* \*